Nov. 5, 1935.   J. KITCHIN   2,020,033
GLARE SHIELD
Filed Oct. 30, 1933
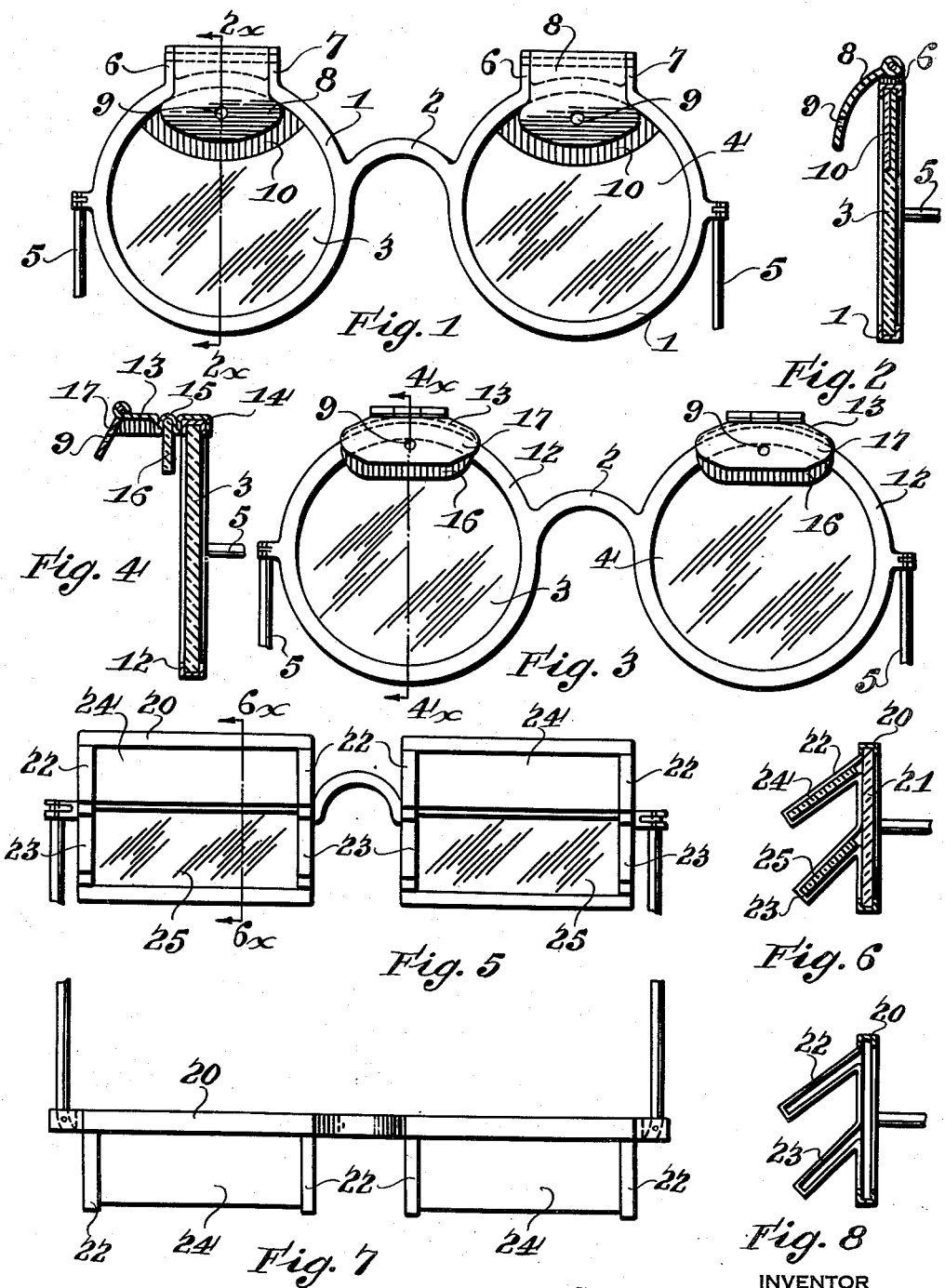
INVENTOR
John Kitchin
BY
Frank Keifer
ATTORNEY Patented Nov. 5, 1935

2,020,033

UNITED STATES PATENT OFFICE 2,020,033

GLARE SHIELD

John Kitchin, Rochester, N. Y.

Application October 30, 1933, Serial No. 695,808

4 Claims. (Cl. 2—12)

The object of this invention is to provide a new and improved type of glare shield that can be worn on the spectacles, or in the form of spectacles, the glare shield being adapted to be brought into active position by tilting the head forward or down, and being adapted to be moved out of active position by the head being moved back or up.

These and other objects of the invention will be illustrated in the drawing, described in the specification and pointed out in the claims at the end thereof.

In the drawing:

Figure 1 is a front elevation of an ordinary pair of spectacles fitted with my improved glare shield.

Figure 2 is a vertical section on the line $2x$—$2x$ of Figure 1.

Figure 3 is a front elevation of a pair of ordinary spectacles equipped with a modified form of the glare shield shown in Figure 1.

Figure 4 is a vertical section on the line $4x$—$4x$ of Figure 3.

Figure 5 is a front elevation of a glare shield of another type fitted to the lenses of the spectacles.

Figure 6 is a vertical section on the line $6x$—$6x$ of Figure 5.

Figure 7 is a top plan view of the combined spectacle and glare shield shown in Figure 5.

Figure 8 is a vertical section on the line $6x$—$6x$ of Figure 5, with the lens and reflecting elements omitted.

In the drawing like reference numerals indicate like parts.

In the drawing reference numeral 1 indicates a spectacle frame having a nose bridge 2, and two spectacle lenses 3 and 4 therein. 5 indicates the hooks that engage over the ears to hold the spectacles in place on the nose. The spectacle frame is formed at the top, above each lens, with two upwardly projecting lugs 6 and 7 between which is pivoted a glare shield 8 which consists of a thin sheet of metal that is bent down and forward as shown in Figure 2 and has a small sight opening therein as indicated at 9 in Figures 1 and 2.

This glare shield is adapted to cover the upper portion of the lens only, so that when the head is bent down or forward slightly, this glare shield is brought between the pupil of the eye and the headlights of the approaching car. The sight opening 9 is brought into line between the pupil of the eye and the headlights with the result that only a small percentage of the light is permitted to pass through this sight opening and reach the eye. This permits the eye to see clearly the road, without being dazzled or blinded by the headlights of the oncoming car, and also permits the eye to see around the edge of the glare shield and thus get a comprehensive view of the road. After the glaring headlights have passed, the head can be raised again to normal position and the eye will then see the distant road under the glare shield instead of through the opening therein.

This glare shield is, of course, intended for night driving, and the shield will be carried in the position shown in Figures 1 and 2 at night. During the daytime the shield can be swung up to a position immediately over the lens, which will enable the driver to see through the lens normally without any interference from the shield.

It will also be understood that the upper part of the lens is formed preferably of colored glass or its equivalent, as indicated at 10, which alone reduces the amount of light that passes therethrough to the eye. The combined effect of the small sight opening and colored glass effectively prevents any strain on the eye.

In Figure 3 I have shown a glare shield of this type detachably mounted on an ordinary pair of spectacles. In this case spectacles with standard frame and lenses are shown, as indicated at 12. A bracket 13 is formed having two channels formed therein opening downwardly. The channel 14 is adapted to engage over the rim of the lens of the spectacle, and the channel 15 is adapted to support a colored piece of glass 16 that will shade the eye in the same way that the shaded portion 10 shades the eye as shown in Figure 1.

On the outer end of this bracket is pivotally mounted a glare shield 17 of sheet metal, which covers the lens and the eye in substantially the same way as does the glare shield 8 shown in Figure 2. This shield also has an opening 9 therein, through which only a small fraction of the light is permitted to pass. This bracket can be attached to the rim of the glass or detached therefrom, as occasion may require, and can therefore be worn on the spectacles at night and be removed therefrom in the daytime.

With the shield in the position shown in Figure 4, only a small portion of the light can pass through the opening when the opening is brought into line between the approaching headlights and the pupil of the eye. This position is secured by simply tilting the head down as the glaring headlights approach. The glare shield otherwise permits a clear view of the road immediately in front of the car by the driver who is driving the car and using the glare shield. By tilting the head up and back, the glare shield is removed so that a clear view of the whole road can be obtained.

It will also be understood that the further this type of glare shield is removed from the pupil of the eye, the less movement must be given to the head to bring it in front of the pupil or to remove it therefrom.

In Figures 5 and 6 I have shown a spectacle having a frame 20, having a lens 21 therein. Projecting forwardly from the frame of this spectacle are the brackets 22 and 23 in which are carried the plates 24 and 25, each having a reflecting surface. The reflecting surface is located on the top of the lower plate 25 and on the bottom of the upper plate 24. The light rays from the approaching headlight will strike the reflecting surface on the top of the bottom plate 25 and are thrown up against the reflecting surface on the bottom of the top plate 24, from which they are reflected rearwardly through the lens of the spectacle.

The plate 25 normally cuts off any light from passing through the lower portion of the lens of the spectacle, and the plate 24 cuts off any light from passing through the upper portion of the lens of the spectacle. By raising the head up and back, these plates 24 and 25 are brought nearer to the horizontal position, which permits light to pass through the spectacle 21 without being interrupted by the reflecting surfaces. But when the head is tilted forward and down, the direct rays are intercepted by the plates 24 and 25 and only the reflected rays pass through the lens. The reflecting surfaces are of dark color, and on that account they absorb a large percentage of the light and reflect only a small percentage thereof, so that the light that passes through the lens and reaches the eye is not sufficient to cause glare or blind the eye.

I claim:

1. A spectacle frame having lenses therein, an opaque glare shield attached to the top of said frame and projecting forward and down therefrom, said shield having a small opening enclosed therein, said opening permitting vision therethrough, means for reducing the visibility through the upper portion of the lens, said shield and its opening and said means being adapted to be brought in the line of vision by tilting the head forward and down and being removed from the line of vision by raising the head up and back, a hinge on which said shield is mounted to swing up to an idle position without disturbing the means for reducing the visibility through the upper portion of the lens.

2. A spectacle frame having sight openings, an opaque glare shield attached to the top of said frame and projecting forward and down therefrom, and covering a small part of the sight openings, said shield having a small opening enclosed therein permitting vision therethrough, said shield with its opening being adapted to be brought in the line of vision by tilting the head forward and down and being removed from the line of vision by raising the head up and back.

3. A spectacle frame having lenses therein, an opaque glare shield attached to the top of said frame and projecting forward and down therefrom and covering a small part of the sight openings, said shield having a small opening enclosed therein permitting vision therethrough, means for reducing the visibility through the upper portion of the lens, said shield and its opening and said means being adapted to be brought in the line of vision by tilting the head forward and down and being removed from the line of vision by raising the head up and back.

4. A spectacle frame having sight openings, an opaque glare shield pivotally attached to the top of said frame and normally projecting forward and down therefrom and covering a small part of the sight openings, said shield having a small opening enclosed therein permitting vision therethrough, said shield with its opening being adapted to be brought in the line of vision by tilting the head forward and down and being removed from the line of vision by raising the head up and back.

JOHN KITCHIN.